(12) United States Patent
Sou et al.

(10) Patent No.: US 6,610,985 B2
(45) Date of Patent: Aug. 26, 2003

(54) ZNMGS-BASED UV DETECTORS

(75) Inventors: Iam Keong Sou, Clear Water Bay (HK); Chi Wai Marcus Wu, Junk Bay (HK); Kam Sing Wong, Clear Water Bay (HK); Ke-Lun George Wong, Sai Kung (HK)

(73) Assignee: The Hong Kong University of Science and Technology, Hong Kong (HK)

( * ) Notice: Subject to any disclaimer, the term of this patent is extended or adjusted under 35 U.S.C. 154(b) by 174 days.

(21) Appl. No.: 09/910,041

(22) Filed: Jul. 23, 2001

(65) Prior Publication Data
US 2003/0020021 A1 Jan. 30, 2003

(51) Int. Cl.$^7$ .................................................. G01T 1/20
(52) U.S. Cl. ...................................................... 250/372
(58) Field of Search ........................... 250/372; 257/453

(56) References Cited

U.S. PATENT DOCUMENTS 5,646,419 A * 7/1997 McCaldin et al. ............. 257/13
6,104,074 A * 8/2000 Chen ........................... 257/453
6,265,727 B1 * 7/2001 Kozodoy et al. .............. 257/21
6,469,319 B1 * 10/2002 Su et al. ....................... 257/78

OTHER PUBLICATIONS

K. Ichino et al., "High temperature growth of ZnS and ZnMgS by molecular beam epitaxy under high sulfur beam pressure." Journal of Applied Physics, vol. 87, No. 9 (May 2000) pp. 4249–4253.*

* cited by examiner

Primary Examiner—Constantine Hannaher
(74) Attorney, Agent, or Firm—Burns, Doane, Swecker & Mathis, L.L.P.

(57) ABSTRACT

UV detectors comprising undoped $Zn_{1-x}Mg_xS$ as the UV responsive active material. Where x exceeds 0.3 the thickness of the active material must be below a critical value, for example if $0.30<x<1.00$, and the active material is formed as a layer of a thickness t wherein $5000 \text{ Å} \geq t \geq 100 \text{ Å}$. A particularly preferred combination of x and thickness is $x=0.57$ and $t \leq 1400$ Å because at around these values the UV response of the active material is similar to the UV response of human skin.

17 Claims, 4 Drawing Sheets

//*ZNMGS-BASED UV DETECTORS*

FIELD OF THE INVENTION

This invention relates to novel optical materials, and in particular to ZnMgS-based materials and to novel photodetectors based on such materials.

BACKGROUND OF THE INVENTION

There are a number of applications for UV detectors requiring a cut-off wavelength of around 300 nm or below. Examples of such applications include flame detection for fire safety, and UV astronomy. Particularly desirable would be a UV detector with a response curve that closely matched the erythemal action spectrum that describes human skin sensitivity to UV radiation.

PRIOR ART

AlGaN alloys have been proposed as the active material for solar-blind UV detectors, and a number of AlGaN Schottky barrier photodiodes have been provided that provide a direct evaluation of solar erythema or sunburning action. However, Al rich AlGaN alloys are still underdevelopment and there remain problems to be overcome. In particular the lack of a lattice-matched substrate leads to the formation of cracks, high-density dislocations and significant concentrations of shallow and deep levels, all of which limit the response time and the visible rejection power of the detectors.

Recently developed ZnSSe Schottky barrier photodiodes can be used to form visible blind UV detectors that can be grown on closely lattice-matched GaP substrates and can be provided with a cut-off wavelength tunable between about 340 nm–400 nm. There remains a need, however, for photodiodes with a still lower cut-off wavelength.

SUMMARY OF THE INVENTION

According to the present invention there is provided a UV detector comprising undoped $Zn_{1-x}Mg_xS$ as the UV responsive active material.

Preferably $x \leq 0.5$, and more preferably still $x \leq 0.30$.

If $x \geq 0.3$, then the thickness of the active material must be adjusted to be kept below a critical thickness depending on the value of x. In preferred embodiments $x<1.00$, and the active material is formed as a layer of a thickness t wherein 5000 Å $\geq$ t $\geq$ 100 Å. A particularly preferred combination is wherein $x=0.57$ and $t \leq 1400$ Å as with these vaules the response of the active material is similar to the response of human skin to UV radiation.

One particularly preferred form of the invention is as a Schottky barrier structure, comprising in sequence: (a) a substrate layer, (b) a first electrode layer comprising $n^+\text{-}Zn_{1-y}Mg_yS{:}Al$, (c) an active layer of $Zn_{1-x}Mg_xS$ formed on at least a part of the upper surface of said first electrode layer, (d) a second electrode layer formed of a transparent conductive material on the upper surface of said active layer, and (e) a conducting material formed on said first electrode as an Ohmic contact (eg an Indium pellet). For example the substrate may be GaP and the second electrode gold.

According to another aspect of the present invention there is provided a method of forming a UV detector comprising the steps of:

(a) depositing a first electrode layer of $n^+\text{-}Zn_{1-y}Mg_yS{:}Al$ on a substrate, (b) depositing a UV responsive active layer of $Zn_{1-x}Mg_xS$ on at least a part of the upper surface of said first electrode layer, (c) depositing a UV transparent second electrode layer on said active layer, and (d) forming an Ohmic contact on said first electrode layer.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
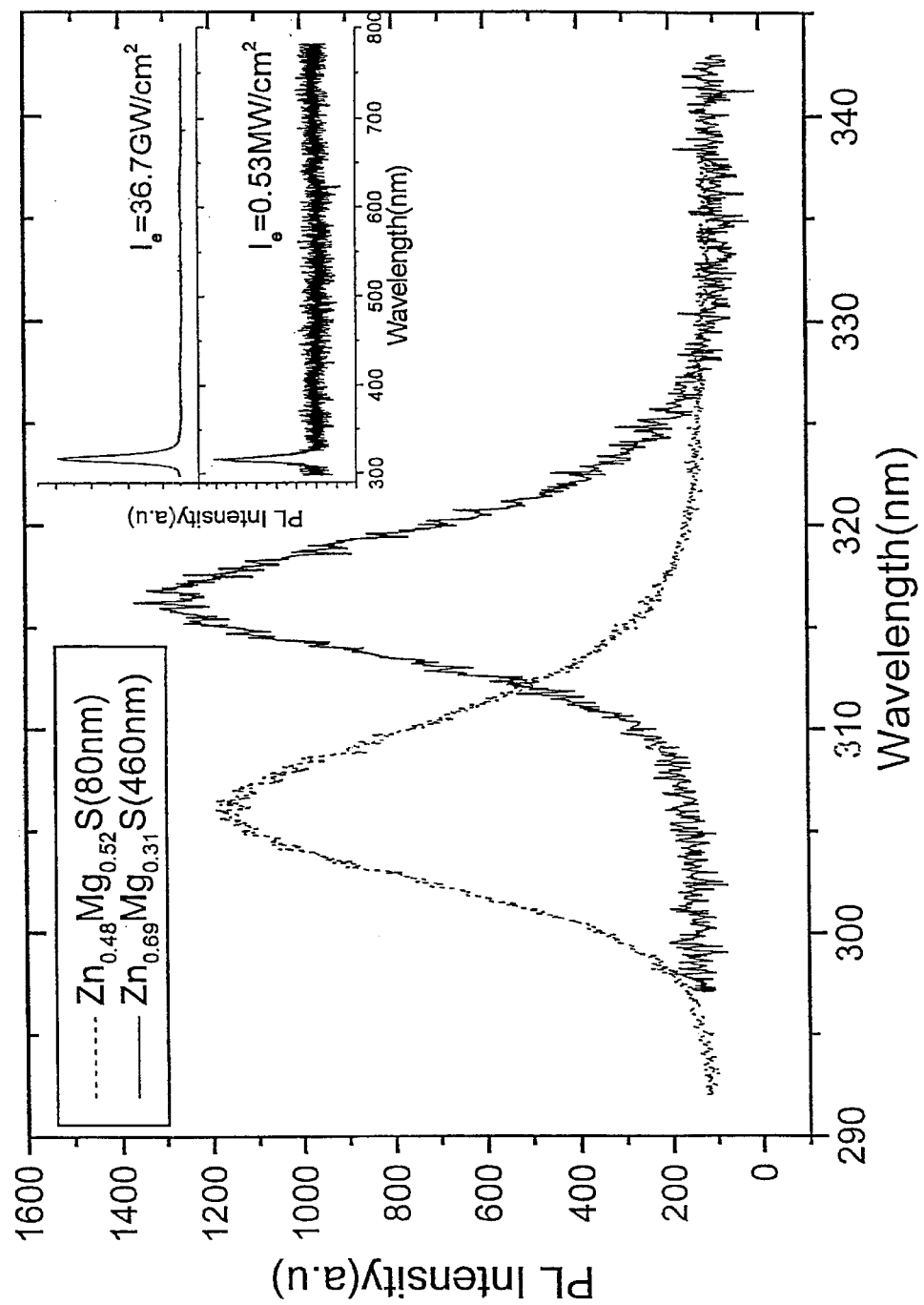
FIG. 1 shows the room temperature photoluminescence spectra of two films according to embodiments of the invention.

In the preferred embodiments of the present invention described below, ZnMgS epitaxial thin film structures are formed using a VG V80H molecular beam epitaxy (MBE) system and deposited on GaP(100) wafers. The GaP wafers were cleaned just before being loaded into the MBE system. Prior to deposition, the GaP wafers are deoxided at 610° C. Growth of the layers was carried out using ZnS, Mg and S sources loaded in three separate effusion cells. The sulphur cell was maintained at about 65° C. during the growth in order to maintain excess sulphur beam pressure. A ZnS buffer layer of about 2000 Å in thickness was firstly grown on the substrate. Reflection high-energy electron diffraction (RHEED) was used to monitor the phase transition during growth. The compositions of the alloys were controlled by adjusting the temperature of the ZnS and Mg effusion cells, while the exact composition was determined from post-growth X-ray photoelectron spectroscopy (XPS) studies after ion sputtering was performed on the as-grown layers to remove the oxided layers on the surface. The structure of the as-grown layers was determined by high-resolution x-ray diffraction (HRXRD) techniques using a Philips MRD HR diffractometer using a Cu anode X-ray beam and a four-crystal Bartels monochromator. Photoluminescence (PL) measurements on the as-grown layers were performed using an excitation wavelength of 275 nm. This laser wavelength was obtained by frequency doubling the 550 nm output of an ultraviolet pumped femtosecond optical parametric amplifier running at 1 KHz repetition rate. The PL signal was dispersed and detected by a Spex 500M spectrometer coupled to a charge-couple device.

ZnMgS-based Schottky barrier type photodiodes in accordance with embodiments of the invention were formed of a structure comprising a bottom electrode consisting of a few thousand Angstrom thick $n^+\text{-}Zn_{0.95}Mg_{0.05}S{:}Al$. An undoped $Zn_{1-x}Mg_xS$ active layer was grown on the top of the bottom electrode layer, and a 100 Å thick Au layer with an area of 3×3 mm² was deposited on top of the undoped layer using thermal evaporation techniques in a separate vacuum chamber to serve as the transparent top electrode. A pair of Indium pellets were soldered onto the bottom electrode layer to serve as the Ohmic contact. Photoresponse measurements on the devices so-formed were carried out using a 150W Xenon arc lamp as the light source. At each wavelength, the power P of the light incident on the Au electrode is measured using a Newport 835 optical power meter that uses a UV-enhanced Si photodiode (818UV) as the photodetector. The short circuit photocurrent $I_{SC}$ was measured as a function of the wavelength of the incident photons using a digital current meter (Keithly Model 237). In order to avoid the second order effect of the monochromator, a low-pass filter with a cut-off wavelength at 345 nm was used in measuring the photoresponse for the long wavelength region.

ZnS thin films can be grown in the form of a zinc blende structure when the substrate (such as GaP) is itself of a zinc blende type. MgS, however, naturally prefers a rock salt structure. The growth of the ZnMgS alloys in the embodiments of the present invention was monitored in situ by RHEED techniques. Coupled with the XPS measurements of the Mg compositions of the as-grown films, it is determined that for Mg composition x of less than 30%, the RHEED patterns of the alloy show bright and streaky patterns similar to a pure ZnS epilayer even for a thickness as thick as 1.5 μm indicating a stable zinc blende type structure. However for Mg compositions greater than 30% there is a critical thickness (which is itself dependent on the Mg composition) at which the zinc blende structure is no longer maintained. This critical thickness depends inversely on the Mg composition ranging from about 5000 Å for compositions just slightly larger than 30%, to about 100 Å as the alloy approaches a pure MgS condition. Values of the critical thickness for different values of x are given in the following table:

| Mg composition | Critical thickness at which structural transition occurs |
| --- | --- |
| ≦30% | No critical thickness |
| 38% | 5000 Å |
| 44% | 2000 Å |
| 57% | 1400 Å |
| 100% (MgS) | 100 Å |

It is important to note that maintaining a zinc blende type structure is important in the achievement of good UV detection performance and thus in the embodiments of this invention either the Mg composition must be kept to 30% or below, or the thickness of the active layer must be less than the critical thickness for the relevant Mg composition.

HRXRD measurements were performed on several $Zn_{1-x}Mg_xS$ layers formed in accordance with preferred embodiments of the present invention at thickness below the critical thickness for the Mg composition. A standard θ/2θ scam of the (004) reflection under optimised conditions for the GaP substrate peak was used. The lattice constants of ZnS and MgS are 5.415 and 5.62 Å while that of the GaP substrate is 5.451 Å. For a layer with Mg composition of 16%, which is closely lattice matched to GaP, the full-width-at-half-maximum (FWHM) of the layer peak is around 300 arc seconds. For layers with larger Mg compositions, the relative lattice mismatch with the substrate leads to a broader peak with FWHM around 600–800 arc seconds.

FIG. 1 displays the photoluminescence spectra of two ZnMgS thin films formed in accordance with an embodiment of the invention and with Mg compositions of 31% and 52% respectively. The 31% Mg layer is formed with a thickness of about 4600 Å, while the 52% Mg layer is formed with a thickness of about 800 Å, ie in both cases below the critical thicknesses for those Mg compositions. The luminescence peak of the 31% layer is centered at about 317 nm, while that of the 52% layer is centered at about 306 nm respectively, both with FWHM of the order of 10 nm. These results indicate that ZnMgS thin films have good optical properties providing that the thickness of the film is below the critical thickness for a given Mg composition at which there is a phase transition.

Figure 2:
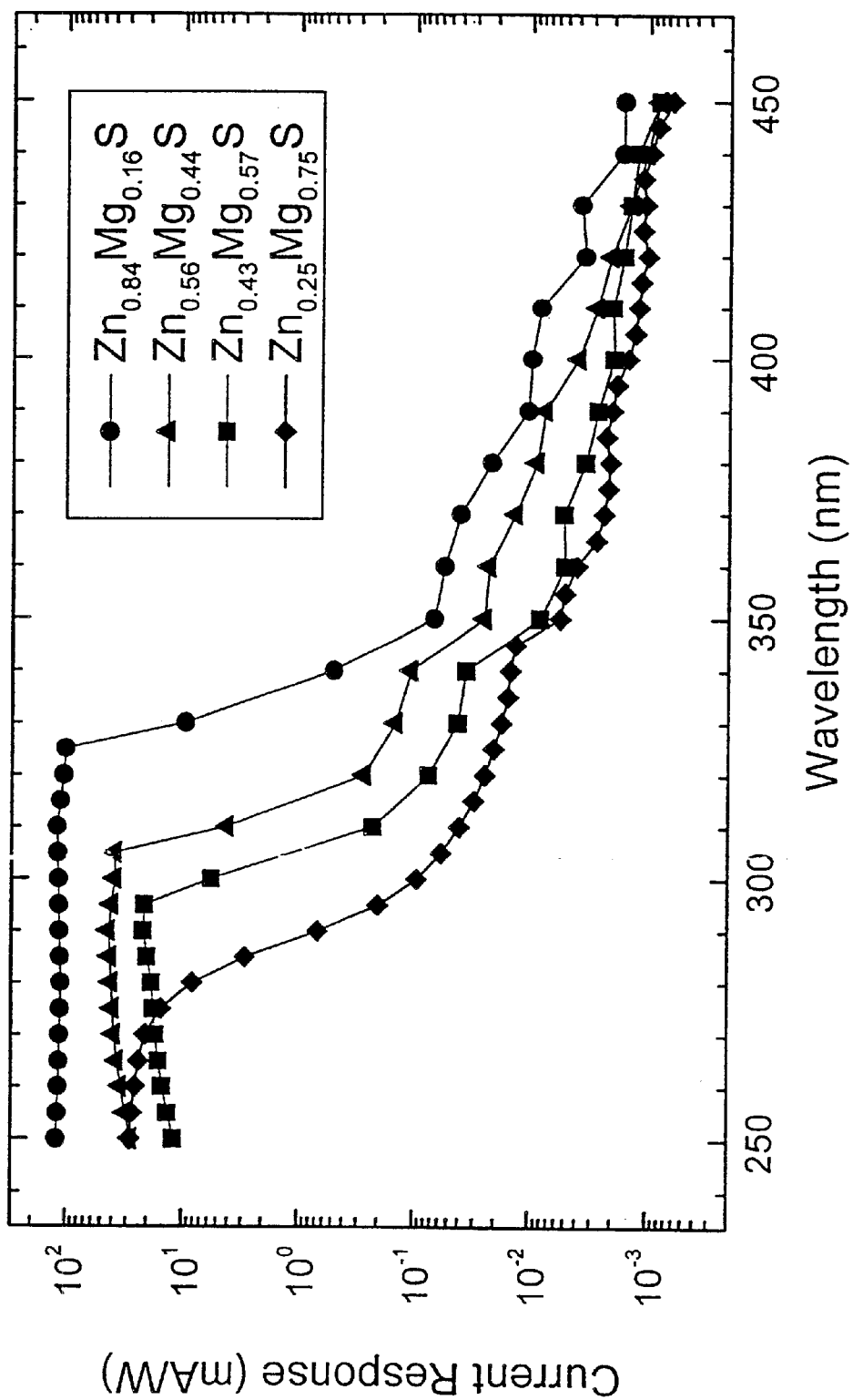
FIG. 2 shows the photoresponse of four Schottky barrier photodiodes made in accordance with embodiments of the present invention.

FIG. 2 shows the response curves for four embodiments of the invention formed as Schottky-barrier type photodiodes. In these embodiments the photodiodes are grown on a GaP (100) substrate as described above. The bottom electrode in each example is a $n^+$ doped layer of $Zn_{0.95}Mg_{0.05}S$:Al with a carrier density of the order of $10^{19}$ $cm^{-3}$. The active layer is an undoped layer of $Zn_{1-x}Mg_xS$ with the thickness of the active layer being less then the critical thickness whenever x is greater than 30%. The thickness of the doped layer forming the bottom electrode, and the value of x and the thickness of the active layer varied in the four samples: in the first example the bottom electrode is 0.78 μm thick when in the active layer the Mg composition is 16% and the active layer thickness is also 0.78 μm; in the second example the bottom electrode layer is 0.59 μm thick when in the active layer the Mg composition is 44% and the active layer thickness is 0.17 μm; in the third example the bottom electrode layer is 0.50 μm thick when in the active layer the Mg composition is 57% and the active layer thickness is 0.14 μm: and finally in the fourth example the bottom electrode layer is 0.40 μm when in the active layer the Mg composition is 75% and the active layer thickness is 0.03 μm. In all four examples the transparent upper electrode is gold with a thickness of 10 nm.

FIG. 2 displays the photoresponse curves of these four examples for the spectral region from 250 nm to 450 nm. The responsivity of the detectors in units of A/W is plotted on the Y axis. All the four curves show a sharp cut-off transition at the band-edge, and in fact at 400 nm (ie the onset of the UV spectral region) their responsivities had already dropped by four orders of magnitude from their peak showing excellent rejection of visible light.

The abrupt cut-off wavelength decreases with increasing Mg concentration, being located at 325 nm, 305 nm, 295 nm and 270 nm for respectively Mg compositions of 16%, 44%, 57% and 75%. This indicates that the cut-off wavelength can be tuned by adjusting the Mg composition to an amount that will give a desired cut-off wavelength.

Figure 3:
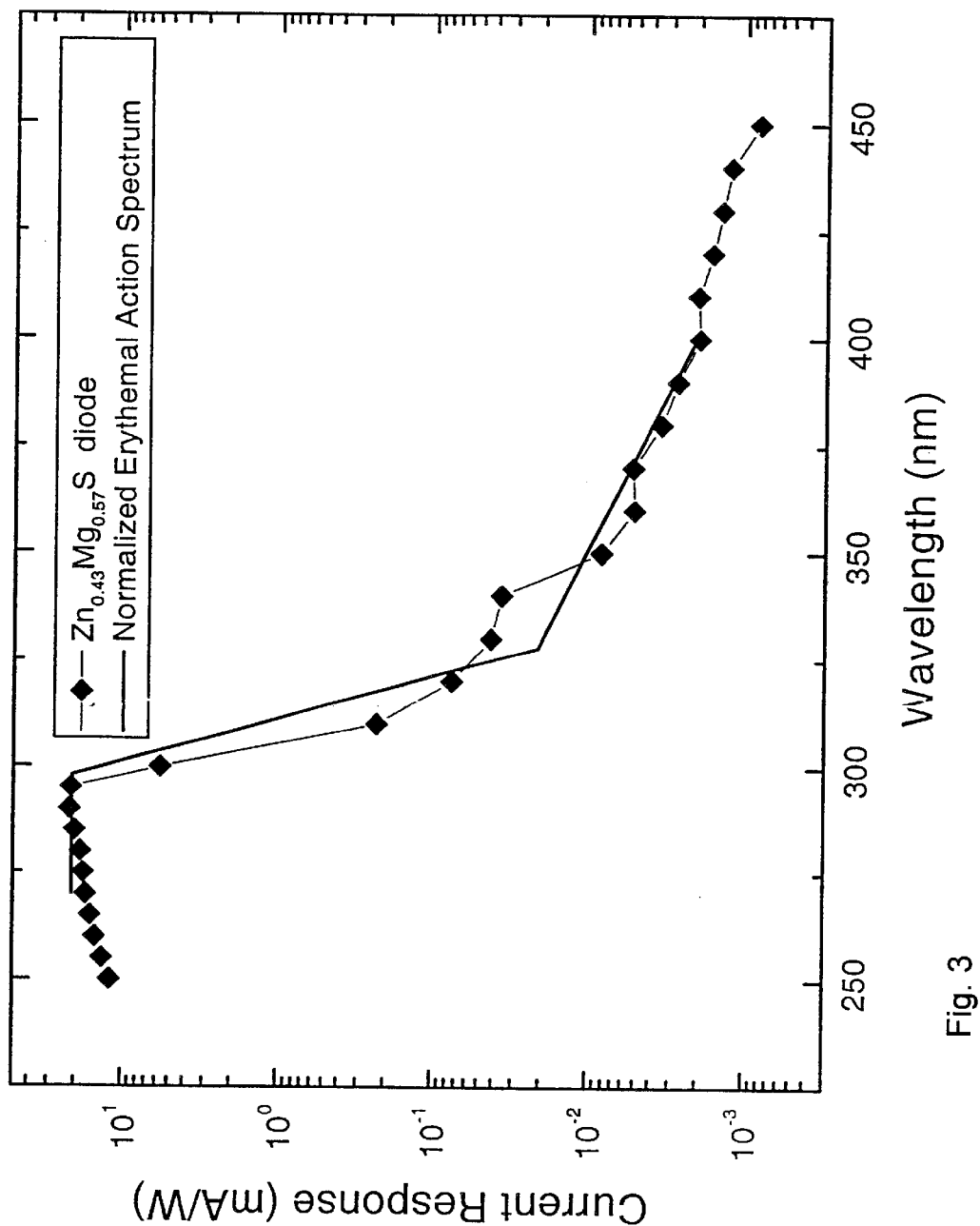
FIG. 3 shows the photoresponse curve of a photodiode made in accordance with an embodiment of the invention and matching the erythemal action spectrum.

One particular applications for the UV detectors of the present invention is in the context of detecting UV radiation that might be harmful to humans. It is well-known that excessive sun exposure can result in painful sunburn and—in extreme cases—the development of life-threatening skin cancers. However, the human skin is not equally sensitive to all forms of ultra-violet light, and the actual sensitivity is described by what is known as the erythemal action spectrum (EAS). The EAS is plotted as a solid line in FIG. 3, and FIG. 3 also plots for comparison the normalised response curve for a photodetector comprising as an active material a thin layer of $Zn_{0.43}Mg_{0.57}S$. The two curves are very similar which shows that a photodetector according to an embodiment of the present invention with a Mg composition of 57% and a thickness below the critical thickness would be particularly useful in devices designed to alert consumers to harmful UV radiation. The detector's response for wavelengths shorter than 290 μm is not important when solar radiation is considered.

Figure 4:
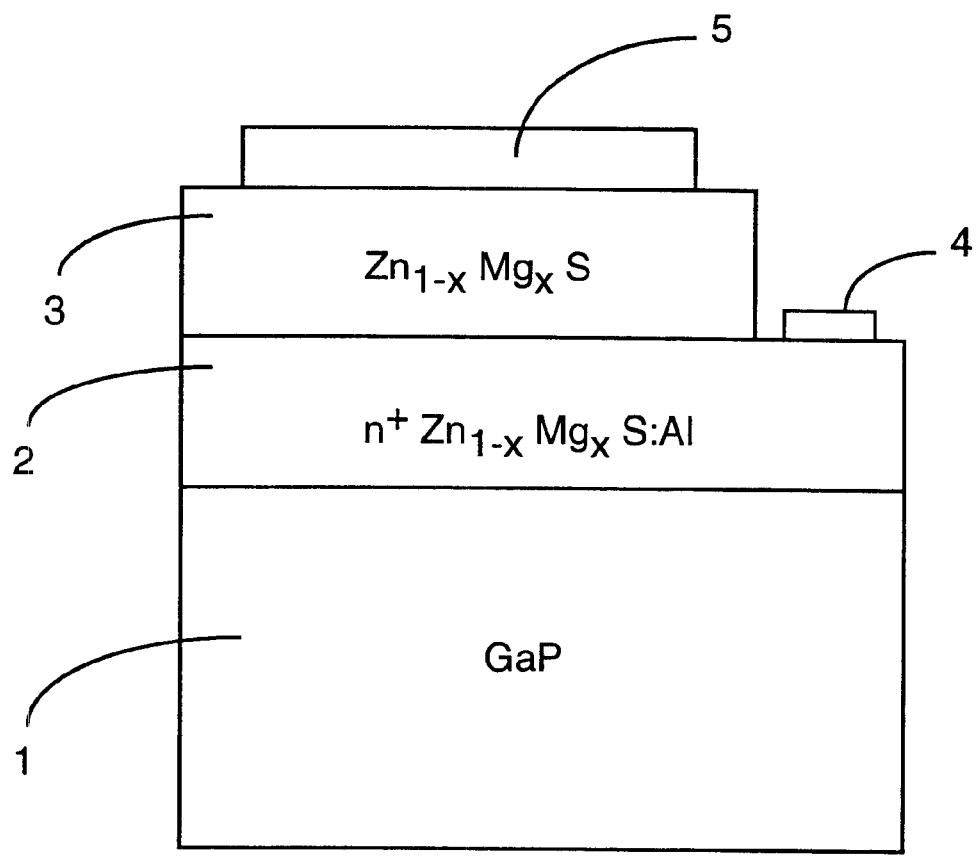
FIG. 4 shows in section an embodiment of the invention in the form of a Schottky barrier structure.

FIG. 4 illustrates one possible structure of a device formed in accordance with the invention. The device comprises a GaP (100) substrate 1 on which is deposited a first electrode layer 2 of $n^+$-$Zn_{1-y}Mg_yS$:Al of a few thousand Angstrom thick. In one example y=0.05 but is not limited to that value. An undoped active layer 3 of $Zn_{1-x}Mg_xS$ is then deposited on the first electrode layer. When $x \leq 0.30$ the active layer 3 may have any desired thickness, whereas as x increases in value above 0.3 the thickness of the active layer must be below a critical thickness that decreases with increasing x. The active layer 3 may be deposited over only a part of the first electrode layer 2, or may be formed over all of the first electrode layer 2 and then may be partially removed. In either case this is to leave a part of the upper surface of the first electrode layer 2 available for the attachment of Indium contacts 4. Finally, a second electrode 5 formed of Au approximately 100 Angstroms thick is deposited on the top surface of the active layer. As an alternative to a pure Au electrode, for better adhesion of the electrode to the active layer one of the following combinations may be used: Au (50 Å)/Cr(50 Å), Au (50 Å)/Ti(50 Å), or Au (50 Å)/Ni(50 Å), with in each case the Cr, Ti or Ni being deposited on the active layer and then the Au being deposited on the Cr, Ti or Ni.

In addition to using the present invention to fabricate a novel Schottky diode structure, the novel active material of the present invention could be employed in a number of other devices, such as for example a metal-semiconductor-metal (MSM) device. MSM devices generally have lower quantum efficiency compared to Schottky diodes, and they require an external bias in operation, but they may have faster response times and thus may have a number of practical applications.

What is claimed is:

1. A UV detector comprising undoped $Zn_{1-x}Mg_xS$ as the UV responsive active material.

2. A detector as claimed in claim 1 wherein $x \leq 0.5$

3. A detector as claimed in claim 1 wherein $x \leq 0.30$.

4. A detector as claimed in claim 1 wherein $0.30 < x < 1.00$, and wherein the active material is formed as a layer of a thickness t wherein 5000 Å $\geq t \geq$ 100 Å.

5. A detector as claimed in claim 4 wherein x=0.57 and $t \leq 1400$ Å.

6. A detector as claimed in claim 1 wherein said detector is a Schottky barrier structure, comprising in sequence:

(a) a substrate layer,
(b) a first electrode layer comprising $n^+$-$Zn_{1-y}Mg_yS$:Al,
(c) an active layer of $Zn_{1-x}Mg_xS$ formed on at least a part of the upper surface of said first electrode layer,
(d) a second electrode layer formed of a transparent conductive material on the upper surface of said active layer, and
(e) a conducting material formed on said first electrode as an Ohmic contact.

7. A detector as claimed in claim 6 wherein said substrate is GaP.

8. A detector as claimed in claim 6 wherein said second electrode layer is formed of gold.

9. A detector as claimed in claim 8 wherein said Ohmic contact comprises at least one indium pellet.

10. A detector as claimed in claim 6 wherein the second electrode layer is formed of Au:Cr or Au:Ti or Au:Ni.

11. A detector as claimed in claim 6 wherein $x \leq 0.5$

12. A detector as claimed in claim 6 wherein $x \leq 0.30$.

13. A detector as claimed in claim 6 wherein the active material is formed as a layer of a thickness t wherein 5000 Å $\geq t \geq$ 100 Å.

14. A detector as claimed in claim 6 wherein said active material layer covers only a first part of the upper surface of said first electrode and wherein said Ohmic contact is formed on a second part of the upper surface of the first electrode.

15. A method of forming a UV detector comprising the steps of:

(e) depositing a first electrode layer of $n^+$-$Zn_{1-y}Mg_yS$:Al on a substrate,
(f) depositing a UV responsive active layer of $Zn_{1-x}Mg_xS$ on at least a part of the upper surface of said first electrode layer,
(g) depositing a UV transparent second electrode layer on said active layer, and
(h) forming an Ohmic contact on said first electrode layer.

16. A method as claimed in claim 15 wherein said layers are formed by molecular beam epitaxy.

17. A method as claimed in claim 15 wherein said active layer is firstly deposited over the complete upper surface of said first electrode layer and is then partially removed.

* * * * *